US010458821B2

(12) United States Patent
Ohmi et al.

(10) Patent No.: US 10,458,821 B2
(45) Date of Patent: Oct. 29, 2019

(54) MOUNTING STRUCTURE FOR A PERIPHERAL INFORMATION DETECTION SENSOR USED IN A VEHICLE INCLUDING AN AUTOMATIC DRIVING SYSTEM

(71) Applicant: TOYOTA JIDOSHA KABUSHIKI KAISHA, Toyota-shi (JP)

(72) Inventors: Masanobu Ohmi, Kasugai (JP); Seiji Yamamoto, Seto (JP); Yoshiaki Matsumura, Toyota (JP); Kosuke Sakakibara, Toyota (JP); Kazuki Sugie, Miyoshi (JP); Misato Kinoshita, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 149 days.

(21) Appl. No.: 15/491,073

(22) Filed: Apr. 19, 2017

(65) Prior Publication Data
US 2017/0307421 A1 Oct. 26, 2017

(30) Foreign Application Priority Data

Apr. 26, 2016 (JP) ................... 2016-088405

(51) Int. Cl.
*G01D 11/30* (2006.01)
*B60R 11/02* (2006.01)
*B62D 35/00* (2006.01)

(52) U.S. Cl.
CPC .......... *G01D 11/30* (2013.01); *B60R 11/0264* (2013.01); *B62D 35/001* (2013.01); *Y02T 10/82* (2013.01)

(58) Field of Classification Search
CPC ............................................... G01D 11/30; G01S 13/93; B60R 1/00; B60R 11/0264; B60R 19/18; B60R 21/00; B62D 35/00; B62D 35/001; B60W 30/16; B60G 13/00
See application file for complete search history.

(56) References Cited

U.S. PATENT DOCUMENTS

| 6,204,820 B1 * | 3/2001 | Jensen, Jr. ............. H01Q 1/005 296/180.1 |
| 2005/0251336 A1 | 11/2005 | Ihara et al. |
| 2012/0327234 A1 | 12/2012 | Fish, Jr. et al. |

(Continued)

FOREIGN PATENT DOCUMENTS

| JP | 53-132121 U | 10/1978 |
| JP | 56-63681 | * 5/1981 |

(Continued)

*Primary Examiner* — Harshad R Patel
*Assistant Examiner* — Nigel H Plumb
(74) *Attorney, Agent, or Firm* — Oblon, McClelland, Maier & Neustadt, L.L.P.

(57) ABSTRACT

A mounting structure for a peripheral information detection sensor includes an aeropart that is disposed above a cabin of a truck, the aeropart including a wall surface that faces toward a front direction, a wall surface that faces toward an upper direction, wall surfaces that face outward in a transverse direction, and a wall surface that faces toward a rear direction. The peripheral information detection sensor is mounted within a space enclosed by the wall surfaces, and a cover is provided on at least one wall surface that lies opposite the peripheral information detection sensor.

15 Claims, 6 Drawing Sheets

(56) References Cited

U.S. PATENT DOCUMENTS

2013/0038734 A1* 2/2013 Furukawa ................ H04N 7/18
　　　　　　　　　　　　　　　　　　　348/148
2016/0297437 A1* 10/2016 Hara ....................... B60R 11/04

FOREIGN PATENT DOCUMENTS

| | | |
|---|---|---|
| JP | 56-63681 U | 5/1981 |
| JP | S58-025254 | 2/1983 |
| JP | 2001-130453 A | 5/2001 |
| JP | 2003-4448 A | 1/2003 |
| JP | 2004-299603 | 10/2004 |
| JP | 2005-267384 | 9/2005 |
| JP | 2005-291808 | 10/2005 |
| JP | 2006-29916 A | 2/2006 |
| JP | 2008-62673 A | 3/2008 |
| JP | 2008-257403 A | 10/2008 |
| JP | 2014-154032 | 8/2014 |
| JP | 2015-140025 | 8/2015 |
| JP | 2016-199257 A | 12/2016 |

* cited by examiner ered in the vehicle transverse direction, a peripheral information detection sensor is mounted within the aeropart and a cover is provided on at least one wall surface of the aeropart that lies opposite the peripheral information detection sensor from among the wall surface of the aeropart facing toward the vehicle body front direction and the wall surfaces of the aeropart facing outward in the vehicle transverse direction, and through which only a detection medium that is required for peripheral information detection can be transmitted.

MOUNTING STRUCTURE FOR A PERIPHERAL INFORMATION DETECTION SENSOR USED IN A VEHICLE INCLUDING AN AUTOMATIC DRIVING SYSTEM

CROSS-REFERENCE TO RELATED APPLICATION

This application is based on and claims priority under 35 USC 119 from Japanese Patent Application No. 2016-088405 filed on Apr. 26, 2016, the disclosure of which is incorporated by reference herein.

BACKGROUND

Technical Field

The present disclosure relates to a mounting structure for a peripheral information detection sensor in a truck having an automated driving system.

Related Art

A structure in which peripheral information concerning a vehicle is detected by means of a vehicle-mounted radar device (i.e., a peripheral information detection sensor) that is mounted on the vehicle roof is known conventionally (see, for example, Japanese Patent Application Laid-Open (JP-A) No. 2005-291808 (Patent Document 1)).

In large-size trucks that travel long distances, the implementation and introduction of automated driving systems in order to alleviate driver fatigue are desired. When an automated driving system is introduced into a large-size truck, a peripheral information detection sensor is mounted, for example, above the cabin. Moreover, where automated driving systems have been introduced into large-size trucks, investigations are now underway into narrowing the inter-vehicular distance between large-size trucks traveling in a convoy formation so that the wind resistance acting on the second and subsequent trucks in the convoy is reduced in order to reduce fuel consumption.

However, compared to normal passenger vehicles, the tires of large-size trucks are much wider, and the tread is deeper. Because of this, there have been cases when comparatively large-size stones have been kicked up by the tires of the preceding large-size truck and have flown onto the top of the cabin of the subsequent large-size truck that is following close behind. Accordingly, in a large-size truck having an automated driving system in which a peripheral information detection sensor is mounted above the cabin, compared with a passenger vehicle, there is a greater possibility that comparatively large-size stones will directly strike the peripheral information detection sensor. In other words, there is a possibility of the peripheral information detection sensor being damaged by these flying stones.

SUMMARY

Therefore, it is an object of the present disclosure to provide a mounting structure for a peripheral information detection sensor that, in a truck having an automated driving system, makes it possible to prevent flying stones from directly striking the peripheral information detection sensor.

In order to achieve the above-described object, the mounting structure for a peripheral information detection sensor according to a first aspect of the present invention is provided with an aeropart that is disposed above a cabin of a truck and that has wall surfaces, the wall surfaces of the aeropart including a wall surface that faces toward a vehicle body front direction, a wall surface that faces toward a vehicle body upper direction, wall surfaces that face outward in a vehicle transverse direction, and a wall surface that faces toward a vehicle body rear direction; a peripheral information detection sensor that is mounted within a space enclosed by the wall surfaces of the aeropart; and a cover that is provided on at least one wall surface that lies opposite the peripheral information detection sensor from among the wall surface of the aeropart facing toward the vehicle body front direction and the wall surfaces of the aeropart facing outward in the vehicle transverse direction, and through which only a detection medium that is required for peripheral information detection can be transmitted.

According to the first aspect, a peripheral information detection sensor is mounted within a space which is enclosed by wall surfaces of an aeropart, and a cover through which only a detection medium that is required for peripheral information detection is able to be transmitted is provided on at least one wall surface lying opposite the peripheral information detection sensor out of the wall surface of the aeropart facing toward the vehicle body front direction and the wall surfaces of the aeropart facing outward in the vehicle transverse direction. Accordingly, in a truck having an automated driving system, even if a flying stone flies close to the peripheral information detection sensor, this flying stone is blocked by the front wall of the aeropart or by the cover. Accordingly, direct strikes from flying stones on the peripheral information detection sensor can be avoided. Note that the 'detection medium' referred to here may be one of a variety of mediums capable of being detected by a peripheral information detection sensor, and includes radio waves, light, and ultrasonic waves and the like.

The mounting structure for a peripheral information detection sensor according to a second aspect is characterized in that, in the mounting structure for a peripheral information detection sensor according to the first aspect, the peripheral information detection sensor is provided either directly or indirectly on the wall surface of the aeropart.

According to the second aspect, a peripheral information detection sensor is provided either directly or indirectly on a wall surface of an aeropart. Accordingly, the peripheral information detection sensor functions as a mass damper so that the natural frequency of the wall surface of the aeropart is decreased.

The mounting structure for a peripheral information detection sensor according to a third aspect is characterized in that, in the mounting structure for a peripheral information detection sensor according to the first aspect, the peripheral information detection sensor is provided via an elastic body on the wall surface of the aeropart.

According to the third aspect, a peripheral information detection sensor is provided via an elastic body on a wall surface of an aeropart. Accordingly, the peripheral information detection sensor and the elastic body function as a dynamic damper so that vibration of the aeropart is decreased.

A mounting structure for a peripheral information detection sensor according to a fourth aspect is provided with an aeropart that is disposed on top of a cabin of a truck and that has wall surfaces, the wall surfaces of the aeropart including a wall surface that faces toward the vehicle body front direction, a wall surface that faces toward the vehicle body upper direction, and wall surfaces that face outward in the vehicle transverse direction; a peripheral information detection sensor that is provided on the wall surface of the aeropart that faces toward the vehicle body upper direction; and a cover that extends toward the vehicle body upper direction from the wall surface of the aeropart so as to be opposite the peripheral information detection sensor, and through which only a detection medium that is required for peripheral information detection is able to be transmitted.

According to the fourth aspect, because the peripheral information detection sensor is provided on the wall surface of the aeropart that faces toward the vehicle body upper direction, in a truck having an automated driving system, the number of times that a flying stone flies close to the peripheral information detection sensor is reduced. Moreover, because a cover through which only a detection medium that is required for peripheral information detection is able to be transmitted extends toward the vehicle body upper direction from the wall surface of the aeropart so as to lie opposite the peripheral information detection sensor, even if a flying stone flies close to the peripheral information detection sensor, this flying stone is blocked by the cover. Accordingly, direct strikes from flying stones on the peripheral information detection sensor can be avoided. Note that the 'detection medium' referred to here may be one of a variety of mediums capable of being detected by a peripheral information detection sensor, and includes radio waves, light, and ultrasonic waves and the like.

The mounting structure for a peripheral information detection sensor according to a fifth aspect is characterized in that, in the mounting structure for a peripheral information detection sensor according to any one of the first through fourth aspects, an upper portion side of the wall surface of the aeropart that faces toward the vehicle body front direction slopes toward the rear.

According to the fifth aspect, an upper portion side of the wall surface of the aeropart that faces toward the vehicle body front direction slopes toward the rear. Accordingly, even if a flying stone flies close to a peripheral information detection sensor, an angle of incidence of this flying stone is shallow, so that even if this flying stone does strike a cover, the probability of the cover becoming damaged is reduced.

According to the first or fourth aspects, in a truck having an automated driving system, incidents of flying stones directly striking a peripheral information detection sensor can be avoided.

According to the second aspect, it is possible to decrease the natural frequency of a wall surface of an aeropart.

According to the third aspect, it is possible to decrease the vibration of an aeropart.

According to the fifth aspect, it is possible to decrease the probability of a cover being damaged.

BRIEF DESCRIPTION OF THE DRAWINGS

Exemplary embodiments of the present disclosure will be described in detail based on the following figures, wherein.

DETAILED DESCRIPTION

Figure 1:
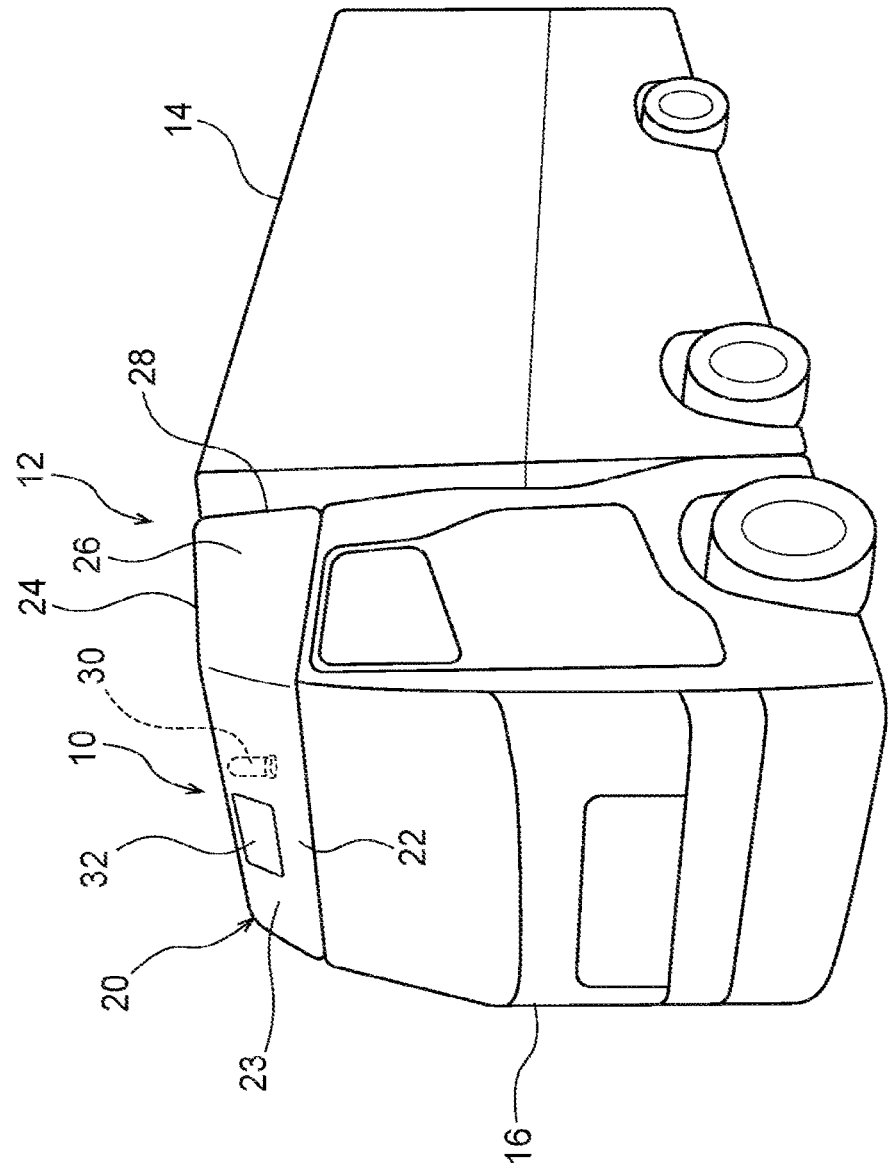
FIG. 1 is a perspective view showing a large-size truck that is provided with the mounting structure for a peripheral information detection sensor according to a first exemplary embodiment.

Hereinafter, exemplary embodiments of the present disclosure will be described in detail based on the drawings. Note that an arrow UP, an arrow FR, and an arrow LH that are shown where appropriate in the drawings respectively indicate a vehicle body upward direction, a vehicle body forward direction, and a vehicle body left-hand side direction. Moreover, unless specifically stated otherwise, if simple up-down, front-rear, or left-right directions are used in the following description, then these refer respectively to the up-down direction of the vehicle body, the front-rear direction of the vehicle body, and the left-right direction of the vehicle body (i.e., the vehicle transverse direction).

First Embodiment

Firstly, a mounting structure 10 for a peripheral information detection sensor 30 according to a first exemplary embodiment will be described. As is shown in FIG. 1, in a large-size truck 12 having a vehicle gross weight of, for example, 11 tons or more (or a maximum loading capacity of 6.5 tons or more), a cabin 16 is disposed at the vehicle front side of a freight container 14. An aeropart 20 that reduces wind resistance when the large-size truck 12 is traveling is disposed on an upper side of the cabin 16.

Figure 2:
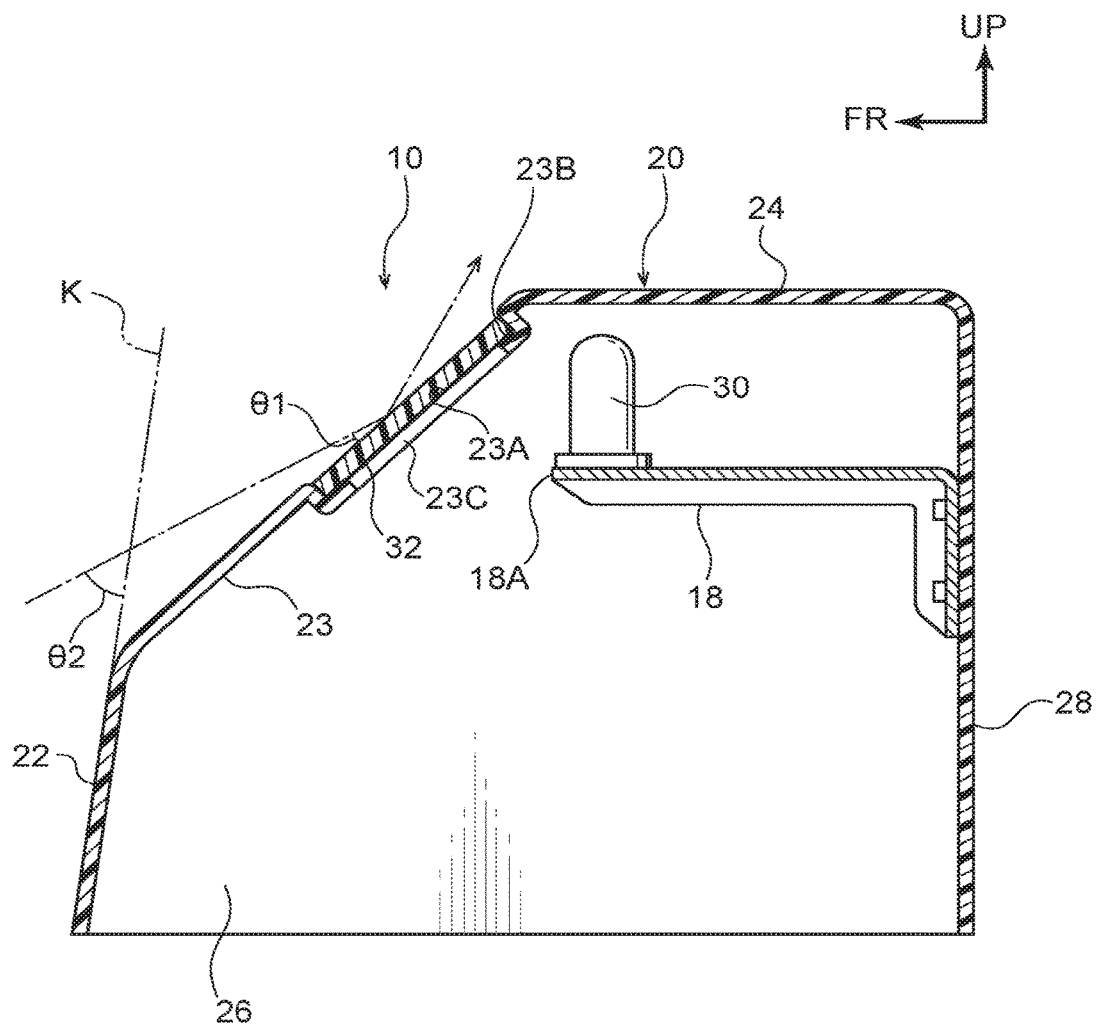
FIG. 2 is a side view showing, in a partial cross-section, the structure of an aeropart of a large-size truck that is provided with the mounting structure for a peripheral information detection sensor according to the first exemplary embodiment.

As is shown in FIG. 2, the aeropart 20 is formed so as to include at least a front wall 22 that forms a wall surface facing toward the vehicle body front direction, a top wall 24 that forms a wall surface facing toward the vehicle body upper direction, left and right side walls 26 that form wall surfaces facing outward in the vehicle transverse direction, and a rear wall 28 that forms a wall surface facing toward the vehicle body rear direction. Note that a top surface of the top wall 24 of the aeropart 20 is substantially flush with a top surface of the freight container 14.

A protruding bracket 18 that has substantially an inverted L-shape when seen in a side view and protrudes toward the vehicle body front direction (i.e., toward an internal surface side of a sloping wall 23 (described below)) is attached to an upper portion side of an internal surface of the rear wall 28. The peripheral information detection sensor 30 which forms one element of an automated driving system, and also forms one element of the mounting structure 10 according to the present exemplary embodiment is provided on an upper surface of a front end portion 18A of the protruding bracket 18.

Namely, the peripheral information detection sensor 30 is provided indirectly on the rear wall 28 of the aeropart 20 via the protruding bracket 18, and is disposed on the upper portion side of a space that is enclosed by the front wall 22, the top wall 24, the left and right side walls 26, and the rear wall 28 of the aeropart 20. Note that the reason why the peripheral information detection sensor 30 is disposed on the upper portion side of the aforementioned space is that this makes it easier for peripheral information relating to the large-size truck 12 to be detected compared to when the peripheral information detection sensor 30 is disposed on the lower portion side of the aforementioned space.

Moreover, a controller (not shown in the drawings) that is electrically connected to the peripheral information detection sensor 30 and that forms one element of the automated driving system is provided in the large-size truck 12. Accordingly, even if a driver is not driving, the large-size truck 12 is able to travel automatically as a result of the controller controlling the accelerator and steering and the like based on peripheral information detected by the peripheral information detection sensor 30. Note that the large-size truck 12 is formed such that it is able to be switched selectively between a manual driving mode in which the driver does the driving, and an automated driving mode in which the controller does the driving.

An upper portion side of the front wall 22 of the aeropart 20 slopes toward the rear, and is formed as a sloping wall 23 that faces diagonally toward the front and upper sides of the vehicle body. In addition, a rectangular cover 32 through which only a detection medium that is necessary in order for peripheral information to be detected is able to be transmitted is provided in the sloping wall 23 (i.e., in the upper portion side of the front wall 22) of the aeropart 20 that is opposite the peripheral information detection sensor 30 in the vehicle body front-rear direction.

More specifically, a rectangular recessed portion 32A having substantially the same size as the cover 32 and substantially the same depth as the plate thickness of the cover 32 is formed in a portion of the sloping wall 23 that lies opposite the peripheral information detection sensor 30 in the vehicle body front-rear direction. A rectangular through hole 23C that is formed slightly smaller than the cover 32 is formed in a bottom portion 23B of the recessed portion 23A.

Accordingly, by fitting the cover 32 inside the recessed portion 23A of the sloping wall 23, and bonding peripheral edge portions of the cover 32 to peripheral edge portions of the bottom portion 23B using an adhesive agent or the like, the cover 32 closes off the through hole 23C and is also mounted substantially flush with the sloping wall 23. Note that the 'detection medium' referred to here may be one of a variety of mediums capable of being detected by the peripheral information detection sensor 30, and includes radio waves, light, and ultrasonic waves and the like.

For this reason, the cover 32 is formed from a material through which radio waves, light, and ultrasonic waves and the like are able to be transmitted. Namely, the cover 32 is formed from a transparent or opaque resin material through which radio waves, light, and ultrasonic waves and the like are able to be transmitted. Note that if the cover 32 is formed from an opaque resin material, then it is desirable for the cover 32 to be the same color as the sloping wall 23.

Next, an action of the mounting structure 10 for the peripheral information detection sensor 30 according to the first exemplary embodiment having the above-described structure will be described.

When the large-size truck 12 is traveling in automated driving mode, in order, for example, to reduce fuel consumption, there are times when the inter-vehicular distance between large-size trucks 12 traveling in a convoy formation is narrowed so that the wind resistance acting on the second and subsequent large-size trucks 12 in the convoy can be reduced. Here, compared to normal passenger vehicles, the tires of the large-size trucks 12 are much wider, and the tread is deeper. Because of this, there have been cases when comparatively large-size stones have been kicked up by the tires of the preceding large-size truck 12 and have flown onto the upper side of the cabin 16 of the subsequent large-size truck that is following close behind.

However, the aeropart 20 having the front wall 22, the top wall 24, the left and right side walls 26, and the rear wall 28 is provided on the upper side of the cabin 16 of the large-size truck 12 according to the present exemplary embodiment, and the peripheral information detection sensor 30 is disposed inside a space that is enclosed by the front wall 22, the top wall 24, the left and right side walls 26, and the rear wall 28 of this aeropart 20. In addition, the cover 32 through which only the detection medium necessary to detect peripheral information is able to be transmitted is provided in the sloping wall 23 so as to lie opposite the peripheral information detection sensor 30.

Accordingly, even if a flying stone that has been kicked up by a tire of the large-size truck 12 traveling in front flies close to the peripheral information detection sensor 30 of the large-size truck 12 which is traveling immediately behind, this flying stone is blocked by the front wall 22 or the side walls 26 of the aeropart 20, or by the cover 32. Accordingly, an incident in which this flying stone directly strikes the peripheral information detection sensor 30 is avoided, and any damage to the peripheral information detection sensor 30 from this flying stone is prevented.

Moreover, the upper portion side of the front wall 22 of the aeropart 20 is formed as the rearward-tilted sloping wall portion 23. Accordingly, as is shown in FIG. 2, even if a flying stone flies close to the peripheral information detection sensor 30 (as shown by the single-dot chain line), an angle of incidence $\theta 1$ of this flying stone is shallower (i.e., smaller) than an angle of incidence $\theta 2$ that would be generated if the upper portion side of the front wall 22 were not sloping toward the rear (as depicted by a virtual line K). Accordingly, even if this flying stone does strike the cover 32, the probability of the cover 32 becoming damaged is reduced.

Moreover, because the peripheral information detection sensor 30 is provided on the rear wall 28 (indirectly via the protruding bracket 18) of the aeropart 20, when the large-size truck 12 is traveling, the aeropart 20 deflects the wind so as to function as a mass-damper that suppresses vibration. Accordingly, the natural frequency in at least the rear wall 28 of the aeropart 20 is decreased so that, effectively, vibration of the aeropart 20, and the noise generated as a consequence thereof, are also reduced. Note that it is also possible to add suitable mass components to the aeropart 20 in addition to the peripheral information detection sensor 30.

Moreover, as has been described above, the peripheral information detection sensor 30 is disposed inside the space that is enclosed by the front wall 22, the top wall 24, the left and right side walls 26, and the rear wall 28 of the aeropart 20, which also forms the design surface of the large-size truck 12. Because of this, compared with a structure in which the peripheral information detection sensor 30 is provided on the outside of the aeropart 20, the advantage is gained that the aesthetic appeal of the exterior of the large-size truck 12 is not adversely affected.

Second Embodiment

Next, a mounting structure 10 for a peripheral information detection sensor 30 according to a second exemplary embodiment will be described. Note that the same symbols are used for portions that are the same as in the above-described first exemplary embodiment and, where appropriate, a detailed description thereof (including actions that are common to both) is omitted.

Figure 3A:
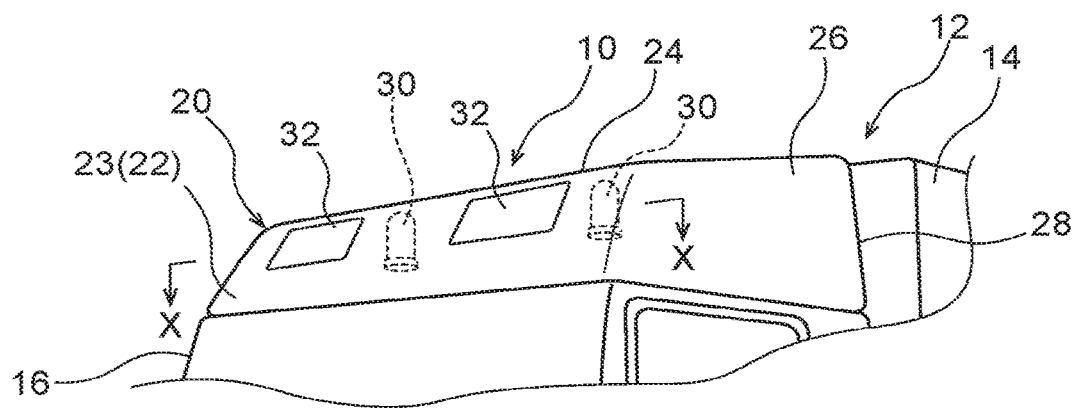
FIG. 3A is a perspective view showing an enlargement of an area above a cabin of a large-size truck that is provided with a mounting structure for a peripheral information detection sensor according to a second exemplary embodiment.
Figure 3B:
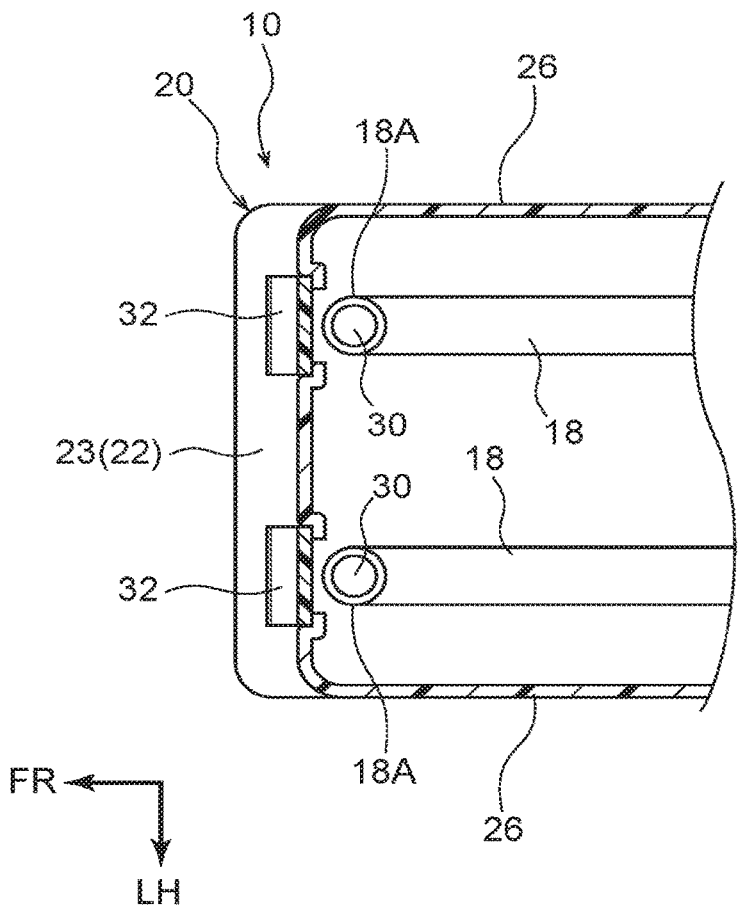
FIG. 3B is a cross-sectional view taken along a line X-X in FIG. 3A.

As is shown in FIGS. 3A and 3B, two peripheral information detection sensors 30 are disposed at a distance from each other in the vehicle transverse direction in the upper portion side of the space enclosed by the front wall 22, the top wall 24, the left and right side walls 26, and the rear wall 28 of the aeropart 20 of this large-size truck 12. More specifically, two protruding brackets 18 are attached at a distance from each other in the vehicle transverse direction on the upper portion side of the internal surface of the rear wall 28, and a peripheral information detection sensor 30 is provided respectively on the upper surface of the front end portion 18A of each protruding bracket 18.

In addition, the covers 32 through which only a detection medium that is necessary in order for peripheral information to be detected is able to be transmitted are provided in the sloping wall 23 (i.e., in the upper portion side of the front wall 22) of the aeropart 20 that lies opposite each peripheral information detection sensor 30 in the vehicle body front-rear direction. Namely, two covers 32 are provided at a distance from each other in the vehicle transverse direction in the sloping wall 23.

According to this type of structure, peripheral information relating to the large-size truck 12 can be detected in more detail, and even if a flying stone that has been kicked up by a tire of the large-size truck 12 traveling in front flies close to the peripheral information detection sensors 30 of the large-size truck 12 which is traveling immediately behind, this flying stone is blocked by the front wall 22 or the side walls 26 of the aeropart 20, or by the covers 32. Accordingly, an incident in which this flying stone directly strikes the peripheral information detection sensors 30 is avoided, and any damage to the peripheral information detection sensors 30 from this flying stone is prevented.

Third Embodiment

Next, a mounting structure 10 for a peripheral information detection sensor 30 according to a third exemplary embodiment will be described. Note that the same symbols are used for portions that are the same as in the above-described first exemplary embodiment and, where appropriate, a detailed description thereof (including actions that are common to both) is omitted.

Figure 4A:
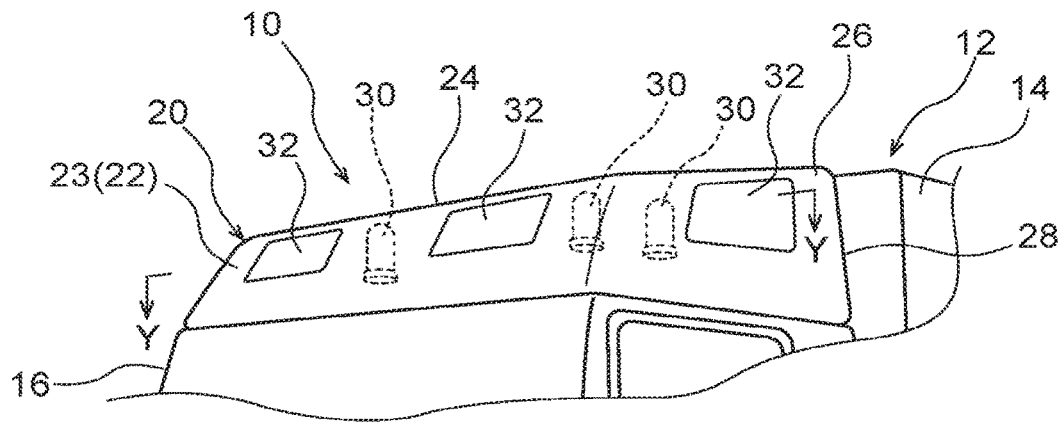
FIG. 4A is a perspective view showing an enlargement of an area above a cabin of a large-size truck that is provided with a mounting structure for a peripheral information detection sensor according to a third exemplary embodiment.
Figure 4B:
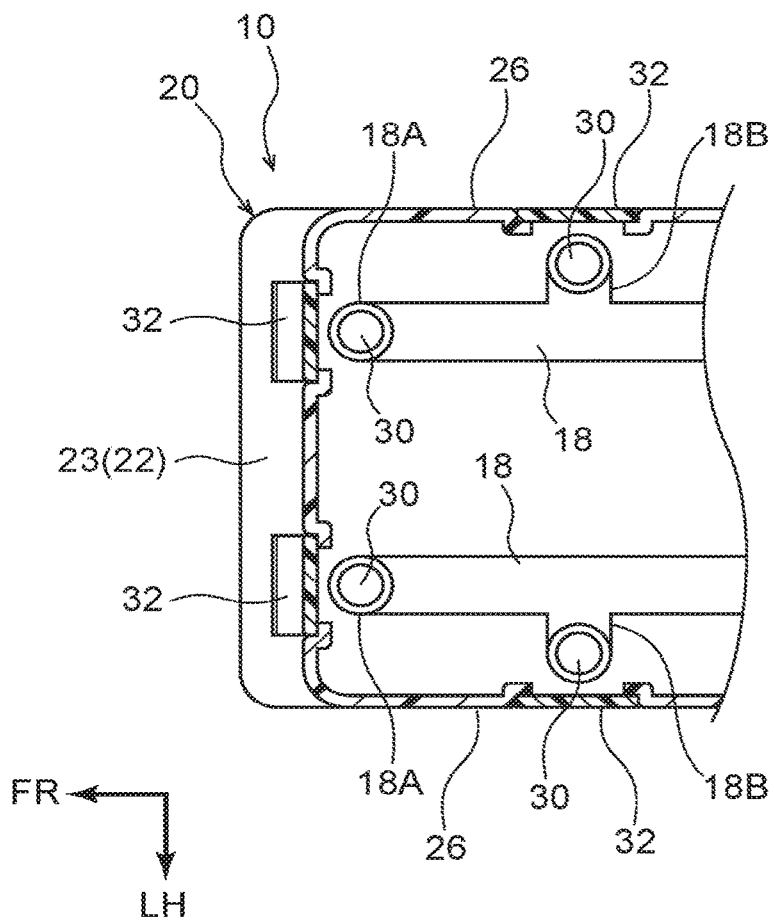
FIG. 4B is a cross-sectional view taken along a line Y-Y in FIG. 4A.

As is shown in FIGS. 4A and 4B, four peripheral information detection sensors 30 are disposed at a distance from each other in both the vehicle transverse direction and the vehicle front-rear direction in the upper portion side of the space enclosed by the front wall 22, the top wall 24, the left and right side walls 26, and the rear wall 28 of the aeropart 20 of this large-size truck 12. More specifically, protruding brackets 18 are attached at a distance from each other in the vehicle transverse direction on the upper portion side of the internal surface of the rear wall 28, and a peripheral information detection sensor 30 is provided respectively on the upper surface of the front end portion 18A of each protruding bracket 18, and on an upper surface of a projecting portion 18B that projects outward in the vehicle transverse direction partway along each one of the protruding brackets 18.

In addition, the covers 32 through which only a detection medium that is necessary in order for peripheral information to be detected is able to be transmitted are provided respectively in the sloping wall 23 (i.e., in the upper portion side of the front wall 22) of the aeropart 20 that is opposite each peripheral information detection sensor 30 in the vehicle body front-rear direction, and in the side walls 26 of the aeropart 20 that are opposite each peripheral information detection sensor 30 in the vehicle body transverse direction. Namely, two covers 32 are provided at a distance from each other in the vehicle transverse direction in the sloping wall 23, and a cover 32 is also provided respectively in each side wall 26.

According to this type of structure, peripheral information relating to the large-size truck 12 can be detected in even greater detail, and even if a flying stone that has been kicked up by a tire of the large-size truck 12 traveling in front flies close to the peripheral information detection sensors 30 of the large-size truck 12 which is traveling immediately behind, this flying stone is blocked by the front wall 22 or the side walls 26 of the aeropart 20, or by the covers 32. Accordingly, an incident in which this flying stone directly strikes the peripheral information detection sensors 30 is avoided, and any damage to the peripheral information detection sensors 30 from this flying stone is prevented.

Fourth Embodiment

Next, a mounting structure 10 for a peripheral information detection sensor 30 according to a fourth exemplary embodiment will be described. Note that the same symbols are used for portions that are the same as in the above-described first exemplary embodiment and, where appropriate, a detailed description thereof (including actions that are common to both) is omitted.

Figure 5:
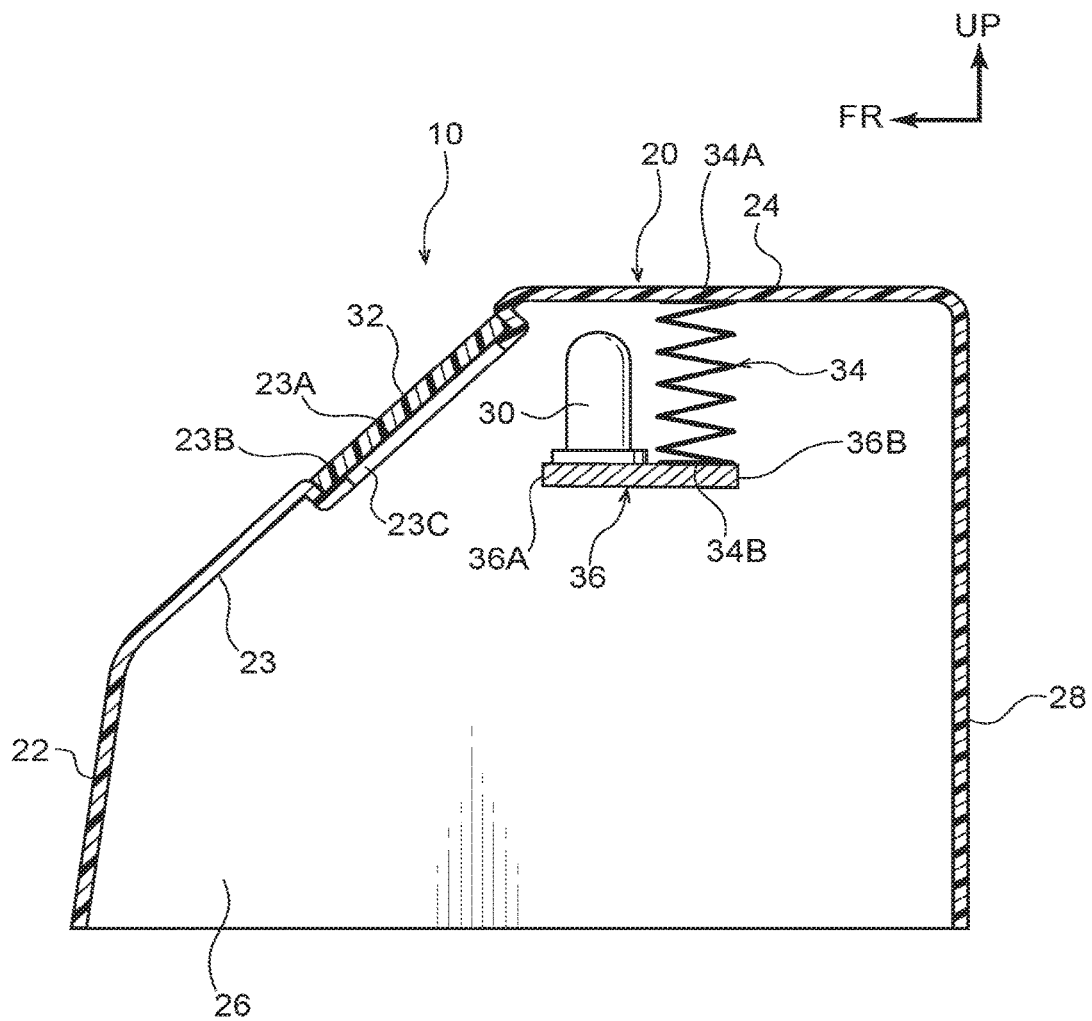
FIG. 5 is a side view showing, in a partial cross-section, the structure of an aeropart of a large-size truck that is provided with the mounting structure for a peripheral information detection sensor according to a fourth exemplary embodiment.

As is shown in FIG. 5, an upper end portion 34A (i.e., one end portion) of a compression coil spring 34, which is serving as an elastic body, is attached to a bottom surface (i.e., an internal surface) of the top wall 24 of the aeropart 20 of this large-size truck 12. In addition, a rear end portion 36B of a supporting bracket 36 is attached to a lower end portion 34B (i.e., another end portion) of the compression coil spring 34, and the peripheral information detection sensor 30 is provided on a top surface of the front end portion 36A of the supporting bracket 36.

Namely, the peripheral information detection sensor 30 is provided indirectly, via the compression coil spring 34, on the top wall 24 of the aeropart 20, and is disposed on an upper portion side of the space that is enclosed by the front wall 22, the top wall 24, the left and right side walls 26, and the rear wall 28 of the aeropart 20. In addition, the cover 32 through which only a detection medium that is necessary in order for peripheral information to be detected is able to be transmitted is provided in the sloping wall 23 (i.e., in the upper portion side of the front wall 22) of the aeropart 20 that is opposite the peripheral information detection sensor 30 in the vehicle body front-rear direction.

Accordingly, even if a flying stone that has been kicked up by a tire of the large-size truck 12 traveling in front flies close to the peripheral information detection sensors 30 of the large-size truck 12 which is traveling immediately behind, this flying stone is blocked by the front wall 22 or the side walls 26 of the aeropart 20, or by the cover 32. Accordingly, an incident in which this flying stone directly strikes the peripheral information detection sensor 30 is avoided, and any damage to the peripheral information detection sensor 30 from this flying stone is prevented.

Moreover, because the peripheral information detection sensor 30 is provided indirectly, via the compression coil spring 34, on the top wall 24 of the aeropart 20, when the large-size truck 12 is traveling, the peripheral information detection sensor 30 functions as a dynamic damper that inhibits the aeropart 20 from resonating due to vibration from the wind and the vehicle body and the like. Accordingly, vibration of the aeropart 20, and the noise generated as a consequence thereof, are reduced.

Fifth Embodiment

Next, a mounting structure 10 for a peripheral information detection sensor 30 according to a fifth exemplary embodiment will be described. Note that the same symbols are used for portions that are the same as in the above-described first exemplary embodiment and, where appropriate, a detailed description thereof (including actions that are common to both) is omitted.

Figure 6:
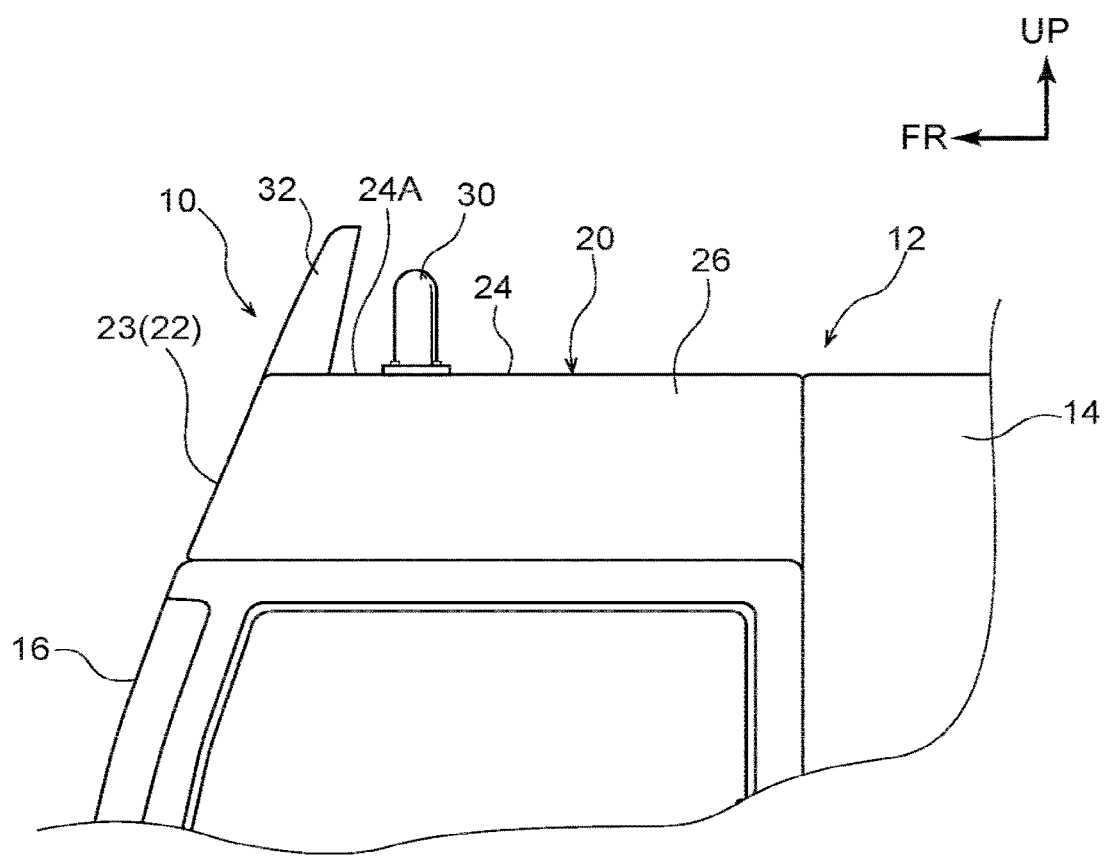
FIG. 6 is a side view showing an enlargement of an area above a cabin of a large-size truck that is provided with a mounting structure for a peripheral information detection sensor according to a fifth exemplary embodiment.

As is shown in FIG. 6, in this large-size truck 12, a peripheral information detection sensor 30 is provided on the top surface on a front end portion 24A side of the top wall 24 of the aeropart 20. In addition, a cover 32 extends toward the vehicle body upper direction from the upper end portion of the sloping wall 23 (i.e., the upper portion side of the front wall 22) of the aeropart 20, and this cover 32 is opposite the peripheral information detection sensor 30 in the vehicle body front-rear direction.

In this manner, when the peripheral information detection sensor 30 is provided on the top surface of the top wall 24 of the aeropart 20, the number of times that flying stones that have been kicked up by a tire of the large-size truck 12 traveling in front fly close to the peripheral information detection sensor 30 of the large-size truck 12 which is traveling immediately behind is reduced. In addition, even if a flying stone does fly over the sloping wall 23 (i.e., the upper portion side of the front wall 22) of the aeropart 20 of the large-size truck 12 traveling behind and flies close to the peripheral information detection sensor 30, this flying stone is blocked by the cover 32.

Accordingly, an incident in which this flying stone directly strikes the peripheral information detection sensor 30 is avoided, and any damage to the peripheral information detection sensor 30 from this flying stone is prevented. Note that it is sufficient for a structure to be employed in which the height of the cover 32 is equal to or higher than the height of the peripheral information detection sensor 30, and the length in the vehicle transverse direction of the cover 32 is approximately the length shown, for example, in FIG. 1, and the cover 32 is provided on the forward side of the peripheral information detection sensor 30. However, it is also possible to employ a structure in which the length in the vehicle transverse direction of the cover 32 is approximately the same as the length in the vehicle transverse direction of the sloping wall 23, and the cover 32 is provided on the front side of the peripheral information detection sensor 30.

The mounting structure 10 for the peripheral information detection sensor 30 according to the present exemplary embodiment has been described above based on the drawings, however, the mounting structure 10 according to the present exemplary embodiments is not limited to the examples illustrated here and appropriate design modifications and the like may be made thereto insofar as they do not depart from the spirit or scope of the present invention. For example, it is also possible for a bottom wall (not shown in the drawings) that forms a wall surface that faces toward the vehicle body lower direction to be provided in the aeropart 20.

Moreover, the present invention is not limited to a structure in which the peripheral information detection sensor 30 is provided indirectly, via the protruding bracket 18, on the rear wall 28 of the aeropart 20 and, although not shown in the drawings, it is also possible to employ a structure in which the peripheral information detection sensor 30 is provided indirectly, via the protruding bracket 18 or the like, on the front wall 22, the top wall 24, or the side walls 26 of the aeropart 20.

Furthermore, the present invention is not limited to a structure in which the peripheral information detection sensor 30 is provided indirectly, via the protruding bracket 18 or the like, on the front wall 22, the top wall 24, the side walls 26, or the rear wall 28 of the aeropart 20 and, although not shown in the drawings, it is also possible to employ a structure in which the peripheral information detection sensor 30 is provided directly on the front wall 22, the top wall 24, the side walls 26, or the rear wall 28 of the aeropart 20. Moreover, it is also possible to employ a structure in which the peripheral information detection sensor 30 is provided directly on the top surface of the cabin 16.

Moreover, although not shown in the drawings, it is also possible to employ a structure in which the two peripheral information detection sensors 30 of the second exemplary embodiment are provided on a single supporting bracket 36 and, as in the peripheral information detection sensor 30 of the fourth exemplary embodiment, these are provided indirectly, via the compression coil spring 34, on the top wall 24 of the aeropart 20.

Moreover, although not shown in the drawings, it is also possible to employ a structure in which the four peripheral information detection sensors 30 of the third exemplary embodiment are provided on a single supporting bracket 36 and, as in the peripheral information detection sensor 30 of the fourth exemplary embodiment, these are provided indirectly, via the compression coil spring 34, on the top wall 24 of the aeropart 20.

Furthermore, although not shown in the drawings, in the fifth exemplary embodiment, it is also possible to employ a structure in which, as in the second and third exemplary embodiments, a plurality of peripheral information detection sensors 30 are provided on the top surface of the top wall 24 of the aeropart 20, and covers 32 are provided that extend respectively from the upper end portion of the sloping wall 23 (i.e., the upper portion side of the front wall 22) and the upper end portion of the side walls 26, or from peripheral edge portions of the top wall 24, and each cover 32 is opposite the corresponding peripheral information detection sensor 30 in the vehicle body front-rear direction or the vehicle transverse direction.

Moreover, in the present exemplary embodiments, the large-size truck 12 is employed as an example of a truck in which the aeropart 20 is provided above the cabin 16, however, the truck according to the present exemplary embodiments is not limited to the large-size truck 12. Provided that the truck according to the present exemplary embodiments has the aeropart 20 provided above the cabin 16, and has the freight container 14 on the vehicle body rear side of the cabin 16, then, for example, a medium-size truck (not shown in the drawings) having a vehicle gross weight of from 5 tons to less than 11 tons (or a maximum loading capacity of from 3 tons to less than 6.5 tons), or a small-size truck (not shown in the drawings) having a vehicle gross weight of less than 5 tons (or a maximum loading capacity of less than than 3 tons) may also be used.

What is claimed is:

1. A mounting structure for a peripheral information detection sensor comprising:
    an aeropart that is disposed above a cabin of a truck and that has wall surfaces, the truck including an automatic driving system, and the wall surfaces of the aeropart including a wall surface that faces toward a vehicle body front direction, a wall surface that faces toward a vehicle body upper direction, wall surfaces that face outward in a vehicle transverse direction, and a wall surface that faces toward a vehicle body rear direction;
    a peripheral information detection sensor that is mounted within a space enclosed by the wall surfaces of the aeropart; and
    a cover that is provided on at least one wall surface that lies opposite the peripheral information detection sensor, among the wall surface of the aeropart facing toward the vehicle body front direction and the wall surfaces of the aeropart facing outward in the vehicle transverse direction, and through which only a detection medium that is required for peripheral information detection can be transmitted.

2. The mounting structure for a peripheral information detection sensor according to claim 1, wherein the peripheral information detection sensor is provided either directly or indirectly on one of the wall surfaces of the aeropart.

3. The mounting structure for a peripheral information detection sensor according to claim 2, wherein an upper portion side of the wall surface of the aeropart that faces toward the vehicle body front direction slopes towards a rear.

4. The mounting structure for a peripheral information detection sensor according to claim 1, wherein the peripheral information detection sensor is provided via an elastic body on one of the wall surfaces of the aeropart.

5. The mounting structure for a peripheral information detection sensor according to claim 4, wherein an upper portion side of the wall surface of the aeropart that faces toward the vehicle body front direction slopes towards a rear.

6. The mounting structure according to claim 4, wherein the peripheral information detection sensor is provided via the single elastic body on one of the wall surfaces of the aeropart.

7. The mounting structure according to claim 4, wherein one end of the elastic body is attached to the wall surface of the aeropart and other end of the elastic body is a free end not attached to the wall surface, and the peripheral information detection sensor is disposed on the free end.

8. The mounting structure according to claim 4, wherein the elastic body is a protruding bracket that protrudes toward an inside of the aeropart from the wall surface that faces toward the vehicle body rear direction or the wall surfaces that face outward in the vehicle transverse direction.

9. The mounting structure according to claim 4, wherein the elastic body is a compression coil spring that is attached to the wall face that faces toward the vehicle body upper direction inside of the aeropart.

10. The mounting structure for a peripheral information detection sensor according to claim 1, wherein an upper portion side of the wall surface of the aeropart that faces toward the vehicle body front direction slopes towards a rear.

11. The mounting structure according to claim 1, wherein the cover is provided so as to close off a through hole that is formed on the at least one wall surface that lies opposite the peripheral information detection sensor.

12. A mounting structure for a peripheral information detection sensor, comprising:
    an aeropart that is disposed on top of a cabin of a truck and that has wall surfaces, the truck including an automatic driving system, and the wall surfaces of the aeropart including a wall surface that faces toward a vehicle body front direction, a wall surface that faces toward a vehicle body upper direction, and wall surfaces that face outward in a vehicle transverse direction;
    a peripheral information detection sensor that is provided on the wall surface of the aeropart that faces toward the vehicle body upper direction; and
    a cover that extends toward the vehicle body upper direction from one of the wall surfaces of the aeropart so as to be opposite the peripheral information detection sensor, and through which only a detection medium that is required for peripheral information detection is able to be transmitted.

13. The mounting structure for a peripheral information detection sensor according to claim 12, wherein an upper portion side of the wall surface of the aeropart that faces toward the vehicle body front direction slopes towards a rear.

14. The mounting structure for a peripheral information detection sensor according to claim 13, wherein the cover is provided on the rearward-sloping portion of the wall surface of the aeropart that faces toward the vehicle body front direction.

15. The mounting structure according to claim 12, wherein the peripheral information detection sensor is provided in contact with only the wall that faces toward the vehicle body upper direction.

* * * * *